Patented May 17, 1938

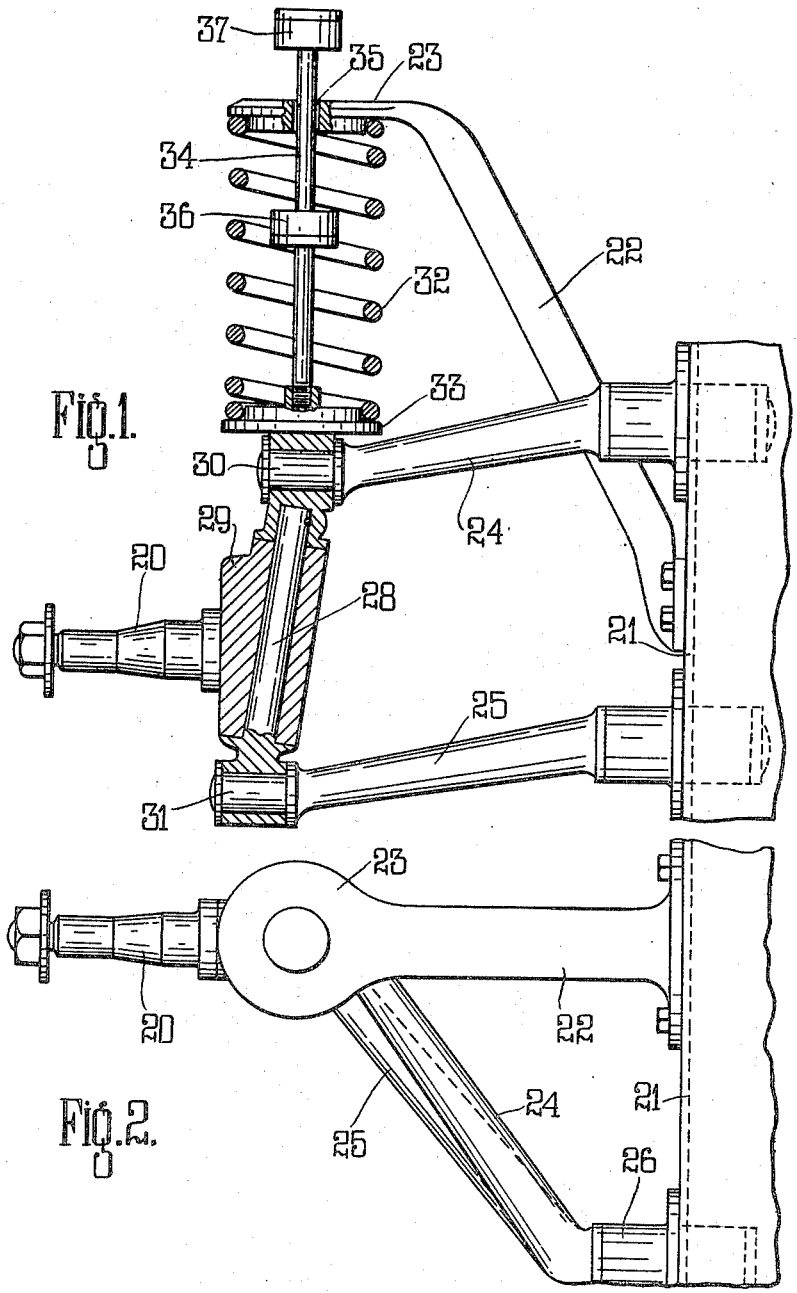

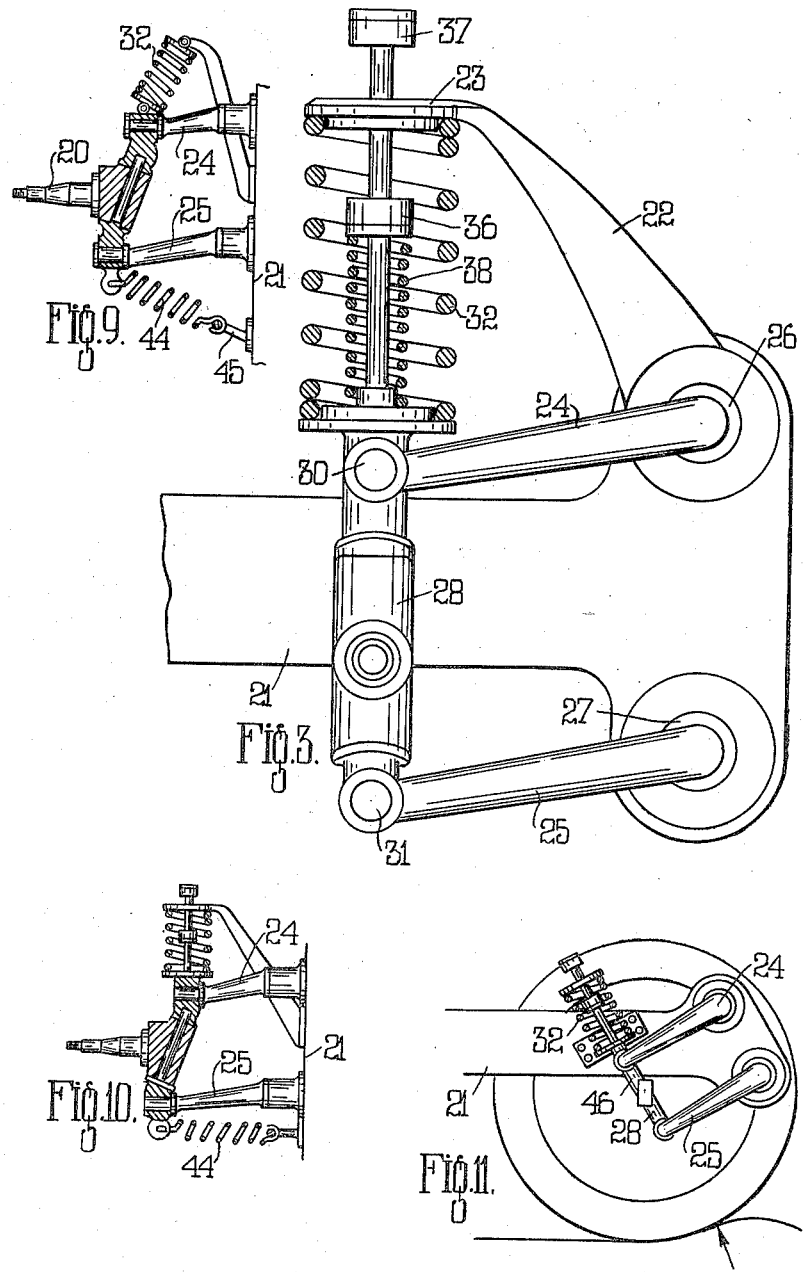

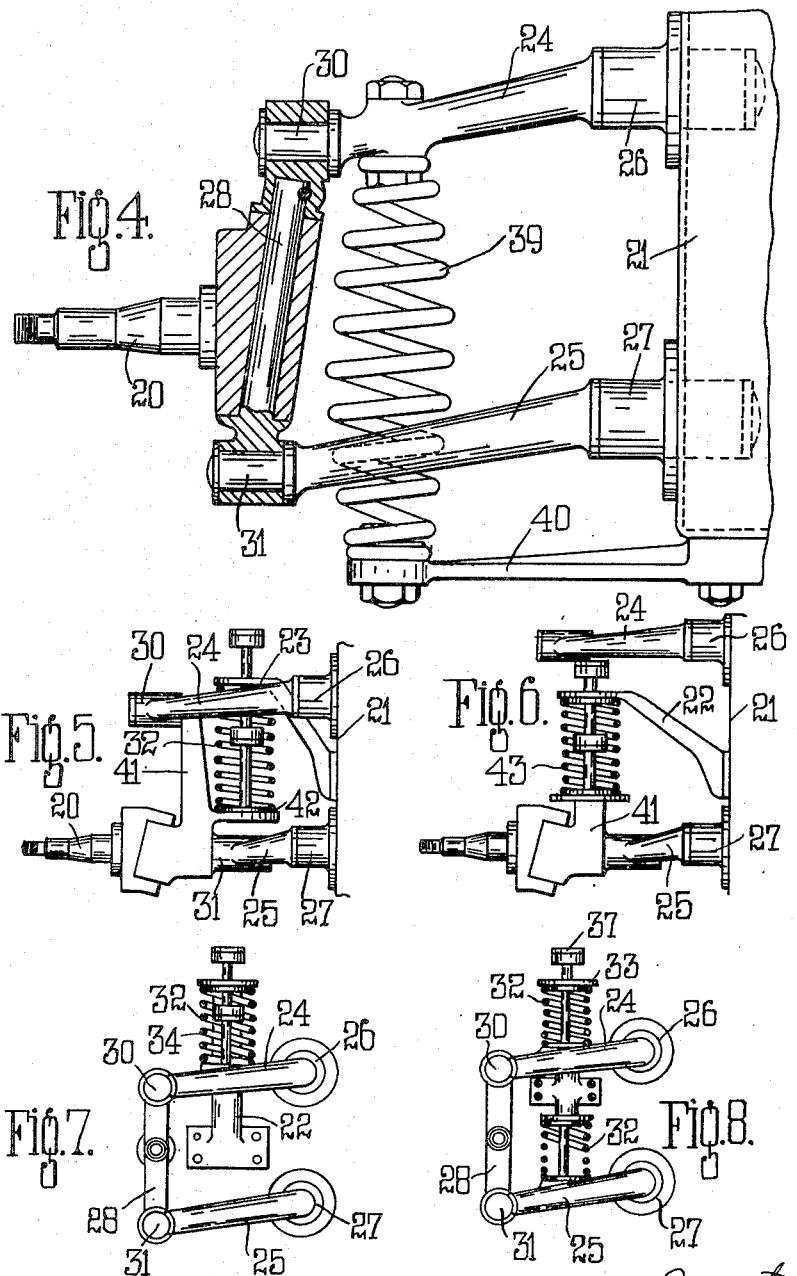

2,117,588

UNITED STATES PATENT OFFICE 2,117,588

SUSPENSION ARRANGEMENT FOR ROAD VEHICLES

Fullerton George Gordon Armstrong, Beverley, England

Application November 23, 1934, Serial No. 754,528
In Great Britain November 29, 1933

11 Claims. (Cl. 267—20)

The present invention relates to suspension arrangements for vehicles of the type in which the frame of the vehicle has a pair of pivots displaced from one another carrying levers the opposite ends of which are attached to an axle of a wheel, the displacement of the levers about their pivots being restrained to a desired degree by resilient means.

In a suspension arrangement for vehicles wherein a wheel axle is suspended from the vehicle frame by a pair of levers which are pivoted to the frame at spaced points and also to a link connected to the wheel axle so as to form with said link three sides of a quadrilateral with the fourth side constituted by the frame between the spaced pivots the present invention from one aspect thereof includes the feature of directly applying a resilient load, for resisting displacement of the three sides relatively to the fourth, between one of said sides and the vehicle frame.

According to another aspect of the present invention both levers are disposed between the frame and an axle of a wheel on one side of said axle to form part of a parallel linkage between said axle and the frame, resilient means acting in a substantially vertical direction being provided directly between either or both of said levers and the frame.

By "resilient means" is meant any system of variable loading, such as, for example, one or more springs which may be of the coil type, rubber blocks, pneumatic means or again hydraulic resistance means. Again, the term "directly between the levers and the frame" excludes the use of additional levers but includes the vertical link which is adapted to connect the levers with the axle of a wheel.

The invention is more particularly described with reference to the accompanying drawings, in which:—

Figure 1 is an elevation of a suspension arrangement viewed from one end of a vehicle in which the frame includes a fixed bracket or abutment and the resilient means consists of a compression spring between the abutment and one end of one of the levers.

Figure 2 is a corresponding plan view of the construction illustrated in Figure 1.

Figure 3 is a corresponding side elevation of the construction according to Figure 1 but with the bracket constituting part of the frame extending from one of the pivots of the levers on the frame instead of from a position spaced apart from said pivots.

Figure 4 is an end elevational view of a modified form of construction wherein a tension spring is employed between one of the levers and a fixed bracket forming part of the frame.

Figure 5 is an end elevational view of a further modified form of construction wherein the resilient load in the form of a compression spring is applied between a platform of a vertical link between the levers and an axle, and a bracket forming part of the frame structure.

Figure 6 is an end elevational view of a construction somewhat similar to Figure 5 but with the compression spring surrounding the vertical link.

Figure 7 is a side elevational view of a modified form of construction wherein the resilient load in the form of a compression spring is applied between a bracket of the frame and a part of one of the levers intermediate the ends of the latter.

Figure 8 shows in side elevation a construction wherein a pair of compression springs are provided each between a bracket forming part of the frame and a lever intermediate the ends of the latter.

Figure 9 is an end view of a construction wherein upper and lower springs are provided between the frame and the ends of the levers carrying the wheel axle, the upper spring being a compression spring slightly inclined to the vertical and the lower being a tension spring.

In Figure 10 which illustrates in end view a slightly modified form of construction to that shown in Figure 9, the upper compression spring is truly vertical and the lower tension spring substantially horizontal.

Figure 11 shows a still further modified form of construction in side elevation wherein the levers normally extend at right angles to the thrust which is applied when a wheel hits an obstruction in its path of travel, the resilient load between the levers and the frame being applied in a direction normal to that of the levers.

In the construction according to the drawings and referring particularly to Figures 1 to 3 a wheel axle is diagrammatically illustrated at 20. This axle may be that of a front or rear wheel or again of a driving or steering wheel whether such be a front or rear wheel. Again it may be common to both wheels either at the front or rear or it may represent a stub or half axle operative with the side wheel only, thereby enabling the suspension of one wheel to be independent of the others.

The vehicle frame is illustrated at 21 and includes a bracket 22 integral therewith, the free end of the bracket 23 being at an angle to the body portion 22. A pair of levers 24, 25 are pivoted to the frame at 26, 27 respectively the ends of said levers remote from their pivots on the frame being interconnected by a king or swivel pin 28 or any other form of substantially vertical link about which the axle 20 is adapted to be angularly displaced with a housing 29 surrounding the pin.

The ends of the levers 24 have pivotal connections 30, 31, with the pin ends so that when the levers are angularly displaced relatively to the frame about their pivots 26, 27 the link 28 retains its position in a vertical plane, that is to say the link 28 and levers 24, 25 form part of a parallel link arrangement, the remaining side of which is constituted by the frame 21.

In the construction according to Figures 1 and 2 the bracket 22 extends from the frame at a point spaced from the pivots 26, 27 of the levers but in the construction shown in Figure 3 the bracket extends from one of the pivot points 26 on the frame whilst still, of course, being rigid with the frame.

The resilient load for resisting relative angular displacement between the levers 24, 25 and the frame 21 when a wheel upon the axle 20 meets an obstruction in its path of travel, is constituted by a compression spring 32 of the coil or helical type, this spring extending from a platform 33 on the substantially vertical link or the end of the upper lever 24 to the angled portion 23 of the bracket 22. A rod 34 connected at its base to the platform 33 of the bracket carries a compression bumping pad 36 adapted to limit the degree of compression of the spring 32 and a rebound bumping pad 37 adapted to limit the rebound of the parts to their normal position. If desired, these bumping pads 36, 37 may be adjustably mounted on the rod 34.

In the construction shown in Figure 3 a compression spring 38 is provided to overcome the thrust on the bearings of the parallel linkage, and carries one of the bumping pads, thereby providing a resiliently loaded bumping pad to take excessive loads or shocks. In Figure 3 this spring surrounds the vertical rod 34 and is enclosed within the compression spring 32. The spring 38 may be used to support either or both of the bumping pads as desired.

It will be appreciated, of course, that the spring 38 may be applied to the construction shown in Figures 1 and 2.

Instead of providing a compression spring between the upper lever 24 and the angled portion 23 of the bracket 22 with the angled portion 23 above the upper lever 24, a tension spring 39 may be provided between the upper arm 24 and a bracket 40 situated adjacent the base of the frame 21. Such a construction is illustrated in Figure 4.

In the construction according to Figure 5 the vertical link 41 is provided with a platform 42 whilst the compression spring 32 is situated between said platform and the angled portion 23 of the bracket forming part of the frame structure 21.

Turning to Figure 6 the spring 32 surrounds the upper portion 43 of the vertical link 41. In this case the bumping pads are mounted on the upper portion 43 of the vertical link, and by this means a separate rod to carry the bumping pads is eliminated.

In the construction shown in side elevation in Figure 7 the compression spring is mounted between the angled portion 23 of the bracket and a part of the upper lever 24 intermediate the ends of the latter, whilst if desired a vertically disposed bracing rod interconnecting the levers may be extended beyond the upper lever coaxially with the spring. This bracing rod may support the spring or the bumping pads. Again if desired the levers may be pivoted to the frame at points intermediate their ends whilst the spring is mounted between the frame and one of said levers on the opposite side of its pivot to that to which the link is connected.

In the construction according to Figure 8 upper and lower springs are provided between the bracket on the frame 21 and parts of the upper and lower levers 24, 25.

In the construction according to Figure 9 an arrangement is provided which is adapted to overcome the thrust produced by the overhang of a wheel on the wheel axle 20 beyond the pivot points of the levers, that is to say the thrust which is caused by virtue of the fact that the lever pivots are not in the same vertical plane normal to the axis of the wheel as that of the wheel itself. This thrust is overcome by slightly inclining the compression spring 32 to the vertical and by providing a tension spring 44 between the base of the substantially vertical link 28 and a point 45 on the frame 21.

In the construction according to Figure 10 the thrust is overcome solely by a lower tension spring which in this case is horizontal, the upper compression spring 32 being vertical.

Turning to Figure 11 it will be observed that when a wheel hits an obstruction in its path of travel the impact produces a force in the direction of the arrow. In this construction the upper and lower levers 24, 25 respectively are arranged at right angles to the direction of the force whilst the connecting link 46 carrying the king pin and the axis of the compression spring 32 are disposed in the direction of said force.

If desired, additional springs may be provided on the various constructions illustrated, the additional spring or springs coming into operation after the levers have been displaced by a predetermined amount. These additional springs may take the place of the bumping pads but may be used in association therewith as illustrated in Figure 3.

It will be appreciated also, of course, that when a vehicle with a suspension arrangement according to the present invention is viewed in side elevation, the levers 24, 25 are positioned on one side of a vehicle axle either extending in front thereof relatively to the vehicle or in rear of the axle. Such levers may take up a position at any desired angle to longitudinal planes of the vehicle, or may extend substantially truly longitudinally of the frame or again in a direction transversely thereof. The springs may be replaced by other resilient means such as rubber pads, or may be in the form of pneumatic means.

The various bearings for the levers, i. e. on the frame and the vertical link at the opposite ends of the levers, may be of the plain bearing type, or again, they may be of the roller, ball or screw type or further they may be of any other type, such as, for example, the resilient type for taking up both radial and end thrusts. Further, shock absorbing or damping means may be applied at one or more of the pivot points.

The link 28 constituting the king or swivel pin or again the link 46 (Figure 11) connected to the king or swivel pin may either be fixed to the axle i. e. have its direction unchanged when the levers are angularly displaced, or if desired, where the levers are of different lengths and their pivotal points on the frame are varied, such links are angularly displaceable, within limits, about the axle 20 when the levers are displaced.

I declare that what I claim is:—

1. A wheel suspension arrangement for vehicles comprising a vehicle frame including a bracket portion, a vehicle wheel, upper and lower levers pivotally connected to said frame at spaced points thereon, a link carrying the axle of said wheel and pivotally connected to the free ends of said levers to constitute with said upper and lower levers three sides of a quadrilateral with the vehicle frame between the spaced pivots representing the fourth side, resilient means directly applied between the uppermost side of the quadrilateral and the vehicle frame for resisting displacement of said three sides with said frame, a rod connected to the uppermost side of the quadrilateral and disposed co-axially of said resilient means, and means including a pair of bumper pads carried by said rod in spaced relationship for cooperation with said bracket portion for limiting displacement of said three sides in both directions.

2. A wheel suspension arrangement for vehicles comprising a vehicle frame including an angle bracket rigidly secured thereto, a vehicle wheel, upper and lower levers pivotally connected to said frame at spaced points thereon, a link carrying the axle of said wheel and pivotally connected to the free end of said levers to constitute with said upper and lower levers three sides of a quadrilateral with the vehicle frame between the spaced points representing the fourth side, at least one helical spring directly applied between the uppermost side of the quadrilateral and said angle bracket on the vehicle frame for resisting displacement of said three sides with said frame, a rod connected to the uppermost side of the quadrilateral and disposed coaxially of said helical spring, and a pair of bumper pads carried by said rod in spaced relationship for cooperation with said bracket for limiting displacement of said three sides in both directions.

3. A wheel suspension arrangement for vehicles comprising a vehicle frame including an angle bracket, a vehicle wheel, upper and lower levers pivotally connected to said frame at spaced points thereon, a swivel pin carrying the axle of said wheel and pivotally connected to the free ends of said levers to constitute with said upper and lower levers three sides of a quadrilateral with the vehicle frame between the spaced pivots representing the fourth side, at least one substantially vertically disposed helical spring directly applied between the upper end of said swivel pin and said angle bracket of the vehicle frame for resisting displacement of said three sides with said frame, a rod connected to said upper lever and disposed coaxially of said helical spring, and a bumper pad carried by said rod for limiting displacement of said three sides.

4. A wheel suspension arrangement for vehicles comprising a vehicle frame including an angle bracket, a vehicle wheel, upper and lower levers pivotally connected to said frame at spaced points thereon and disposed in intersecting vertical planes at an angle to said frame, a swivel pin extending out of the vertical and carrying the axle of said wheel and pivotally connected to the free ends of said levers to constitute with said upper and lower levers three sides of a quadrilateral with the vehicle frame between the spaced pivots representing the fourth side, a helical spring directly applied between the upper end of said swivel pin and said angle bracket to resist relative displacement between the frame on one hand and the levers and swivel pin on the other, a rod connected to said upper lever and disposed coaxially of said helical spring, and a bumper pad carried by said rod for limiting displacement of said three sides.

5. A wheel suspension arrangement for vehicles comprising a vehicle frame having an angle bracket thereon, a vehicle wheel, upper and lower levers pivotally connected at one end to said frame at spaced points thereon with the other ends of the levers disposed below the free end of the angle bracket, a link carrying the axle of said wheel and pivotally connected to the free ends of said levers, a helical compression spring disposed directly between the free end of said angle bracket and the upper end of said link to resist relative displacement between said bracket and said link and the levers pivotally connected thereto, a rod connected to the said upper lever and disposed co-axially of said helical spring, and means including a pair of bumper pads carried by said rod in spaced relationship for cooperation with said bracket for limiting displacement of the link and of said levers in both directions.

6. A wheel suspension arrangement for vehicles comprising a vehicle frame having a bored bracket rigidly mounted thereon, a vehicle wheel, upper and lower levers pivotally connected to said frame at spaced points thereon, a link carrying the axle of said wheel and pivotally connected to the free ends of said levers to constitute with said upper and lower levers three sides of a quadrilateral with the vehicle frame between the spaced pivots representing the fourth side, a helical spring directly applied between the uppermost side of the quadrilateral and said vehicle frame for resisting relative displacement of said three sides with said frame, a rod carried by one of said three sides and passing through said bore in said bracket to extend co-axially with said helical spring and a pair of bumping pads on said rod to limit relative displacement of said three sides with said bracket in both directions of displacement.

7. A wheel suspension arrangement for vehicles comprising a vehicle frame have a bored bracket rigidly mounted thereon, a vehicle wheel, upper and lower levers pivotally connected to said frame at spaced points thereon, a link carrying the axle of said wheel and pivotally connected to the free ends of said levers to constitute with said upper and lower levers three sides of a quadrilateral with the vehicle frame between the spaced pivots representing the fourth side, a helical spring directly applied between one of said three sides and said vehicle frame for resisting relative displacement of said three sides with said frame, a rod carried by one of said three sides and passing through said bore in said bracket to extend co-axially with said helical spring, a pair of bumping pads on said rod and a resilient connection between said bumping pads and said three sides to limit the relative displacement of said three sides with said frame yet preventing shock at the limits of said displacements.

8. A wheel suspension arrangement for vehicles comprising a vehicle frame having a bracket rigidly mounted thereon, a vehicle wheel, upper and lower levers pivotally connected to said frame at spaced points thereon, a link carrying the axle of said wheel and pivotally connected to the free ends of said levers to constitute with said upper and lower levers three sides of a quadrilateral with the vehicle frame between the spaced pivots representing the fourth side, a platform carried by said link, a substantially vertical helical spring disposed directly between said platform and said bracket to resist relative displacement of said three sides with said frame, a rod connected to said platform and disposed co-axially of said helical spring, and means including a pair of bumper pads carried by said rod in spaced relationship for cooperation with said bracket for limiting displacement of said three sides in both directions.

9. A wheel suspension arrangement for vehicles comprising a vehicle frame, an angle bracket secured to said frame, upper and lower levers pivotally connected to said frame at spaced points thereon with the spaced points disposed out of the vertical, a king pin for the axle of said wheel, a link carrying said king pin and pivotally connected to the free ends of said levers to extend normally in the direction of applied force when said vehicle wheel meets an obstruction in its path of travel, resilient means between said link and said bracket to resist relative displacement of said levers and link with said frame, a rod connected to the said upper lever and disposed coaxially of said resilient means, and a pair of bumper pads carried by said rod in spaced relationship and cooperating with said angle bracket for limiting displacement of said levers and of said link.

10. A wheel suspension arrangement for vehicles comprising a vehicle frame having a bracket portion, a vehicle wheel, upper and lower pivots on said frame, the axes of which lie transversely of said frame, upper and lower levers respectively connected to said transverse upper and lower pivots, a link carrying the axle of said wheel and pivotally connected to the free ends of said levers to constitute with said upper and lower levers three sides of a quadrilateral with the vehicle frame between the spaced pivots representing the fourth side, resilient means directly applied between the upper end of said link and the vehicle frame for resisting displacement of said three sides with said frame in planes longitudinally of said frame, a rod connected to one of said sides and disposed co-axially of said resilient means, and means including a pair of bumper pads carried by said rod in spaced relationship for coooperation with said bracket portion for limiting displacement of said three sides in both directions.

11. A wheel suspension arrangement for vehicles comprising a vehicle frame including an angle bracket, a vehicle wheel, upper and lower levers pivotally connected to said frame at substantially vertically spaced transverse pivots thereon, a swivel pin carrying the axle of said wheel and pivotally connected to the free ends of said levers to constitute with said upper and lower levers three sides of a quadrilateral with the vehicle frame between the spaced pivots representing the fourth side, resilient means directly applied between said swivel pin and said angle bracket of the vehicle frame for resisting displacement of said three sides with said frame, in planes longitudinally of said frame, a rod connected to one of said sides and disposed coaxially of said resilient means, and a bumper pad carried by said rod for limiting displacement of said three sides.

FULLERTON GEORGE
GORDON ARMSTRONG.